(12) United States Patent
Michael

(10) Patent No.: US 11,648,453 B2
(45) Date of Patent: May 16, 2023

(54) ADDRESSABLE LIGHTING AND SCOREKEEPING SYSTEM

(71) Applicant: Bradley Steven Michael, Morongo Valley, CA (US)

(72) Inventor: Bradley Steven Michael, Morongo Valley, CA (US)

( * ) Notice: Subject to any disclaimer, the term of this patent is extended or adjusted under 35 U.S.C. 154(b) by 377 days.

(21) Appl. No.: 16/900,733

(22) Filed: Jun. 12, 2020

(65) Prior Publication Data

US 2020/0391095 A1 Dec. 17, 2020

Related U.S. Application Data

(60) Provisional application No. 62/861,266, filed on Jun. 13, 2019.

(51) Int. Cl.
| | |
|---|---|
| *A63B 71/06* | (2006.01) |
| *A63B 67/06* | (2006.01) |
| *F21S 9/02* | (2006.01) |
| *F21V 23/00* | (2015.01) |
| *H04W 84/18* | (2009.01) |
| *F21Y 115/10* | (2016.01) |
| *F21W 131/40* | (2006.01) |

(52) U.S. Cl.
CPC .......... *A63B 71/0669* (2013.01); *A63B 67/06* (2013.01); *A63B 71/0622* (2013.01); *F21S 9/02* (2013.01); *F21V 23/003* (2013.01); *A63B 2071/0625* (2013.01); *A63B 2209/00* (2013.01); *A63B 2220/808* (2013.01); *A63B 2220/833* (2013.01); *A63B 2225/50* (2013.01); *A63B 2225/74* (2020.08); *F21W 2131/40* (2013.01); *F21Y 2115/10* (2016.08); *H04W 84/18* (2013.01)

(58) Field of Classification Search
CPC .. A63B 67/06; A63B 69/0002; A63B 71/0669
See application file for complete search history.

(56) References Cited

U.S. PATENT DOCUMENTS

| | | | | |
|---|---|---|---|---|
| 4,119,838 | A | 10/1978 | Genuit | |
| 4,491,954 | A | 1/1985 | Genuit | |
| 4,838,557 | A * | 6/1989 | Floyhar | A63F 3/0645 |
| | | | | 273/237 |
| 4,971,331 | A * | 11/1990 | Fabian | A63F 3/00261 |
| | | | | 273/284 |
| 5,685,779 | A * | 11/1997 | Tsoukalas | A63D 15/20 |
| | | | | 473/1 |
| 5,839,976 | A * | 11/1998 | Darr | A63B 5/22 |
| | | | | 273/237 |
| 6,331,145 | B1 * | 12/2001 | Sity | A63F 9/0468 |
| | | | | 273/138.2 |

(Continued)

*Primary Examiner* — Eugene L Kim
*Assistant Examiner* — Christopher Glenn
(74) *Attorney, Agent, or Firm* — Timothy W. Fitzwilliam

(57) ABSTRACT

A lighting and scorekeeping system particularly applicable to leisure games is disclosed herein. The system is further applicable to games played to a score of twenty-one. Additionally, the system can be operated and customized locally or remotely with a wireless ad hoc network. Light arrays are programmable and/or addressable and uniquely laid out. One or more epoxy inlays are included for ambiance and partial light transmission. In a preferred embodiment, the system is configured to a cornhole game board.

8 Claims, 4 Drawing Sheets

(56) References Cited

U.S. PATENT DOCUMENTS

| | | | |
|---|---|---|---|
| 7,607,666 B1* | 10/2009 | Studier | A63B 63/00 116/222 |
| 7,854,528 B2 | 12/2010 | Sergretto et al. | |
| 8,162,318 B1 | 4/2012 | Peterson et al. | |
| 8,807,569 B1* | 8/2014 | Davis | F41J 5/20 473/570 |
| D781,960 S | 3/2017 | Calwalga | |
| 9,687,709 B2 | 6/2017 | Riniti | |
| 10,286,276 B2* | 5/2019 | O'Neill | A63B 67/06 |
| 2005/0127609 A1* | 6/2005 | Raslowsky | A63B 67/06 273/402 |
| 2006/0061034 A1 | 3/2006 | Poffenberger | |
| 2007/0191141 A1* | 8/2007 | Weber | A63B 69/0026 473/478 |
| 2008/0015058 A1* | 1/2008 | Noble | A63B 63/007 473/423 |
| 2008/0182686 A1* | 7/2008 | Kellogg | A63B 69/0002 473/451 |
| 2009/0115133 A1* | 5/2009 | Kelly | A63F 3/00643 273/274 |
| 2009/0298622 A1* | 12/2009 | Roberts | G01P 15/00 367/90 |
| 2010/0317470 A1* | 12/2010 | Cea | A63B 67/06 473/570 |
| 2011/0204564 A1* | 8/2011 | Chen | A63F 3/00643 273/237 |
| 2011/0263355 A1* | 10/2011 | Delorme | A63B 69/0026 473/446 |
| 2012/0139417 A1 | 6/2012 | Moronichev et al. | |
| 2012/0146291 A1* | 6/2012 | Walker | A63B 24/0021 273/371 |
| 2014/0035226 A1* | 2/2014 | Dayal | A63F 7/0608 273/129 V |
| 2014/0091525 A1* | 4/2014 | Ramirez | A63B 63/08 273/402 |
| 2014/0217674 A1* | 8/2014 | Kochuba | F41J 9/00 273/359 |
| 2015/0054221 A1* | 2/2015 | Sandman | A63B 60/16 273/402 |
| 2015/0069702 A1* | 3/2015 | Wouhaybi | A63F 3/00006 273/237 |
| 2015/0190695 A1* | 7/2015 | Bonventre | A63B 69/0053 273/400 |
| 2016/0192783 A1 | 7/2016 | Kelly | |
| 2017/0138586 A1 | 5/2017 | Finch et al. | |
| 2018/0085649 A1 | 3/2018 | O'Neill | |
| 2018/0154233 A1 | 6/2018 | Mueller et al. | |
| 2019/0353342 A1 | 11/2019 | Finch et al. | |

\* cited by examiner

ADDRESSABLE LIGHTING AND SCOREKEEPING SYSTEM

PRIORITY CLAIM

This patent application claims benefit of the priority date of U.S. Prov. Pat. App. Ser. No. 62/861,266 filed on Jun. 13, 2019 entitled "Embeddable Addressable Lighting and Scorekeeping with Wireless Communication." Accordingly, the entire content of this U.S. provisional patent submission is hereby expressly incorporated by reference.

BACKGROUND OF THE INVENTION

Field of the Invention

The present invention pertains generally to lighting and electronic scorekeeping systems. More specifically, the present invention relates to an embeddable, addressable lighting system, also featuring wireless communication, particularly adaptable to cornhole scorekeeping, and other leisure or competition skill games.

Description of the Prior Art

Ever increasing in popularity, leisure games are enjoyed by Americans having a competitive nature and such games can enhance a festive atmosphere. Cornhole, table tennis, horseshoes, and shuffleboard are but a few examples with certain commonalities such as they all typically are played to a score of twenty-one points and usually the winner must win by two points.

Innovations with regard to adding electronics and scorekeeping to these games have also unsurprisingly occurred. One example has been proposed by Segretto et al, U.S. Pat. No. 7,854,528 entitled "Illumination Apparatus for Bag Toss Game." Another example was similarly proposed by Davis, U.S. Pat. No. 8,807,569 entitled "Illuminated Bag Toss Game." As told by Segretto, Cornhole, also called Corn Toss, has recently become quite popular. In this game, which is very similar to horseshoes, players take turns pitching small bags, filled with corn, sand or beans, at a raised platform having a six-inch diameter hole, centered nine inches from the far end of the platform. The bags are sized for entry into the holes. The platforms, which are often decorated, are made of rigid plywood or plastic. Different scores are provided for bags tossed, or knocked into the hole or that land on the board without sliding off. Generally, a corn bag in the hole counts for three points, while one on the platform scores one point. Play continues until one player reaches a score of twenty-one. Regulation-size platforms are four feet by two feet, with the back end raised one foot and the front end about two to four inches above the ground. The two platforms are spaced at a regulation distance of twenty-seven feet, similar to the stakes in horseshoes. Additionally, there should be twelve feet of vertical clearance above the playing area. As such, the cornhole game is designed for outdoor play. As in horseshoes, players may be grouped into teams or matched individually.

Being an outdoor game, cornhole is generally intended to be played during daylight hours. However, since it is an excellent outdoor party game, it is often played during the evening where the lighting may not be optimal. Providing sufficient lighting at nighttime may not be optimal. Having sufficient lighting for evening play may not only be inconvenient, but undesirable since it may detract from the ambiance desired at an outdoor party.

In addition, cornhole, horseshoes, table tennis, shuffleboard and the like all typically require manual scorekeeping relying on the memories of the players. Heretofore, embedded or bolt-on lighting solutions made available are very limited in their on-the-fly customization abilities with respect to layout, color and brightness. The available tools for scorekeeping are also limited in their features and ease of use, especially at night. Also presently, no electronic solution exists that can effectively keep score in higher ambient light environments as direct sunlight can make it nearly impossible to see lights during the day. It should further be noted that the popularity of such leisure games has grown to a point where organized and professional leagues have formed demonstrating a need for advancement in the art.

Also, specifically with regard to the cornhole game, no current solution can currently communicate score changes between different sides of the game, when said game sides are located at a distance. The problem becomes more pronounced when only two players are competing and the game requires changing from one side of play to the other after each round of bag tosses. Also, no present solution incorporates recent advancements in wireless and mobile cell phone technology.

Additionally further, no known solution for providing lighting and electronic scorekeeping is retrofittable to existing games. Still further no known solution provides a microcontroller and software for customization and user preferences. Yet further, no solution provides an addressable game system comprising a wireless ad hoc network for data sharing, mobile display and user interface. Yet still further no electronic scoring solution is usable under conditions of direct sunlight.

Hence there remains a need. Additional novel configurations are detailed herein.

BRIEF SUMMARY OF THE INVENTION

The present invention specifically addresses and alleviates the above-mentioned deficiencies, more specifically, the present invention, in a first aspect, is an electronic lighting and scorekeeping system for competitive leisure games comprising: an LED (light emitting diode) light array for providing scorekeeping and ambiance to the competitive game; a programmable microcontroller including an integrated radio transceiver configured to a printed circuit board (PCB); a first game board for containing and incorporating the LED light array and providing said scorekeeping; a battery configured to the first game board for powering the LED array; a speaker for transmitting an audible tone, the audible tone additionally providing scorekeeping; and at least one user-interface (e.g. mobile device, GUI) for command and control of the LED light array providing scorekeeping and ambiance, wherein a combination of LEDs from the LED light array communicate a player or a team's score.

The invention in this aspect is additionally characterized in that the programmable microcontroller further comprises an integrated transceiver coupled to an antenna. Also in a preferred embodiment, the user interface comprises at least one mobile device, wherein the LED array together with the at least one mobile device and the microcontroller form a wireless ad hoc network.

The invention in this aspect is additionally characterized as comprising a microphone for receiving a multiplicity of sound waves converting signals therefrom to the LED light array; and a second game board is provided coupled to the wireless ad hoc network. Software is also provided for controlling electrical current pulse thereby providing an addressable LED light array.

In still a second aspect, the invention is directed to an electronic lighting and scorekeeping system for competitive (leisure) games comprising: an LED light array for providing scorekeeping and ambiance to the competitive game; a first game board for containing and incorporating the LED light array and providing said scorekeeping; at least one translucent epoxy inlay configured to the first game board, the at least one epoxy inlay for partial transmission of light from the LED light array, wherein epoxy material is poured into a hole, channel or mold in (or configured to) the first game board, the epoxy material subsequently hardening and providing the partial transmission of light.

The invention in this aspect is further characterized in that the LED array comprises a plurality of individual LEDs, wherein further the at least one epoxy inlay further comprises an epoxy inlay encircling an individual LED. A target LED has an epoxy inlay ring encircling the target LED. Still further, the LED array comprises a plurality of individual LEDs, wherein the first game board further comprises an acrylic sheet is configured over at least one of the plurality of individual LEDs.

In yet a third aspect, the invention is characterized as an electronic lighting and scorekeeping system for competitive (leisure) games comprising: a first plurality of individual score-keeping LED lamps, the first plurality of LED lamps for tracking a score of a first individual player or team; and a second plurality of individual score-keeping LED lamps juxtaposed (or opposite) to the first plurality of LED lamps, the second plurality of LED lamps for tracking a score of a second individual player or team, wherein each of the first and second plurality of individual score-keeping LED lamps corresponds to a single point for a respective individual player or team.

The invention in this aspect is additionally characterized in that the first and second plurality of score keeping LED lamps each comprises four sets of five individual score-keeping LEDs, thereby totaling twenty score-keeping LEDs; and advantage indication score-keeping LED representing a twenty-first point and also representing a score of "advantage" wherein a player or team must win by two points.

Still further in this aspect, the invention is characterized wherein each set of five individual score-keeping LEDs are arranged in a shape of an "X" with an individual score-keeping LED at each corner and in a center. Or a set of five LEDs is arranged in a circle at equal intervals thereby occurring at each point of a five-sided star.

Still further in this aspect, the electronic lighting and scorekeeping system for competitive games of claim 9, further comprises: a printed circuit board (PCB) comprising: a programmable microcontroller that includes software for user command and control; and an integrated radio transceiver; a (e.g. lithium battery) power source; a plurality of user control push buttons; a (simple tone or AC configured for full audio) speaker for providing audible indications including the score of the first and second individual player or team; and a microphone for detecting baseline music or a game piece impacting a game board.

The invention also touts a sleep timer together with the microphone for detecting a game piece impacting a game board, wherein the system is configured to temporally deactivate (sleep mode) after a predetermined time. The system herein further comprises: a game board providing support and rigidity to the electronic lighting and scorekeeping system, the game board including a surface and an outer frame surrounding the surface; a plurality of translucent LED mounting caps for housing and containing each of the first and second plurality of individual score-keeping LED lamps, each of said plurality of translucent LED mounting caps comprising threads for combining and incorporating to the surface of the game board; a plurality of ambiance LEDs; and a plurality of ambiance LED mounting brackets for attaching each of the plurality of ambiance LEDs to an interior facing side of the outer frame.

Last but not least, he electronic lighting and scorekeeping system for competitive games further comprises at least one translucent epoxy inlay configured to at least one ambiance mounting bracket, the at least one epoxy inlay for partial transmission of light.

These, as well as other advantages of the present invention, will be more apparent from the following description and drawings. It is understood that changes in the specific structure shown and described may be made within the scope of the claims, without departing from the spirit of the invention.

While the apparatus and method has or will be described for the sake of grammatical fluidity with functional explanations, it is to be expressly understood that the claims, unless expressly formulated under 35 USC § 112, or similar applicable law, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC § 112 are to be accorded full statutory equivalents under 35 USC § 112, or similar applicable law. The invention can be better visualized by turning now to the following drawings wherein like elements are referenced by like numerals.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF PREFERRED EMBODIMENTS

Figure 1A:
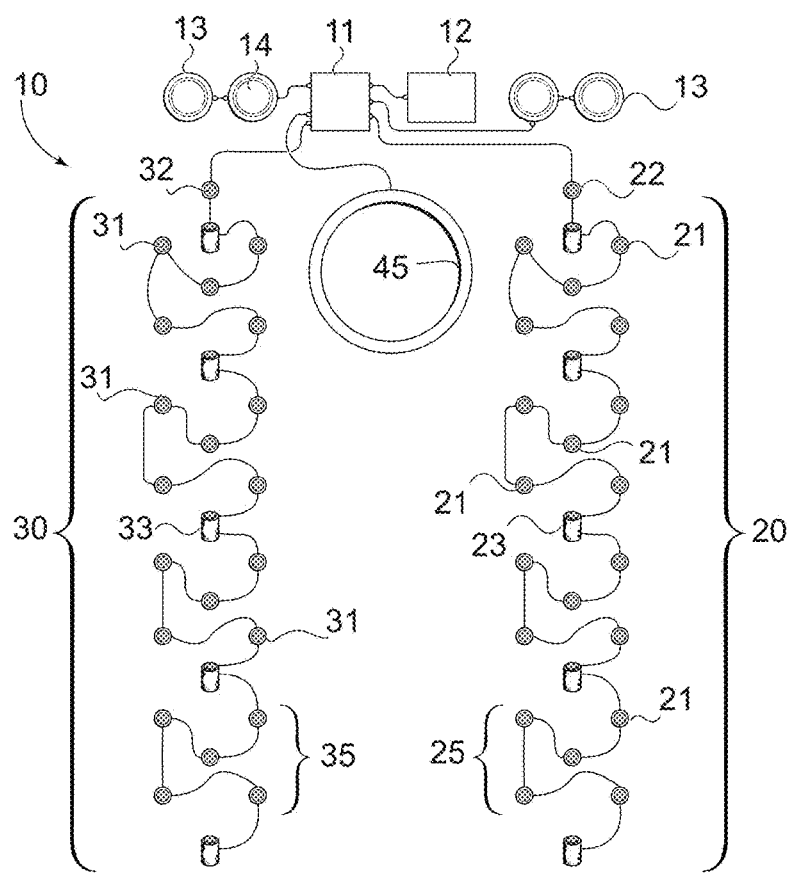
FIG. 1A is a top plan view of an addressable LED array and scorekeeping system of the present invention.

Initially with regard to FIG. 1A, the basic components for an electronic lighting and scorekeeping system 10 herein is shown in a top plan view. The system 10 is contemplated for leisure games 40 that in some cases are becoming organized competition or leagues. Fundamentally, the invention has a first plurality 20 of individual score-keeping LED lamps 21 for tracking a score of a first individual player or team. Opponent(s) score is maintained by an opposing second plurality 30 of individual score-keeping LED lamps 31 juxtaposed to the first plurality 20 of LED lamps. Each LED 21, 31 corresponds to a single point for the respective player; and in this example layout 20, 30, the score counts from the bottom of the array 20, 30 to the top.

Figure 1B:
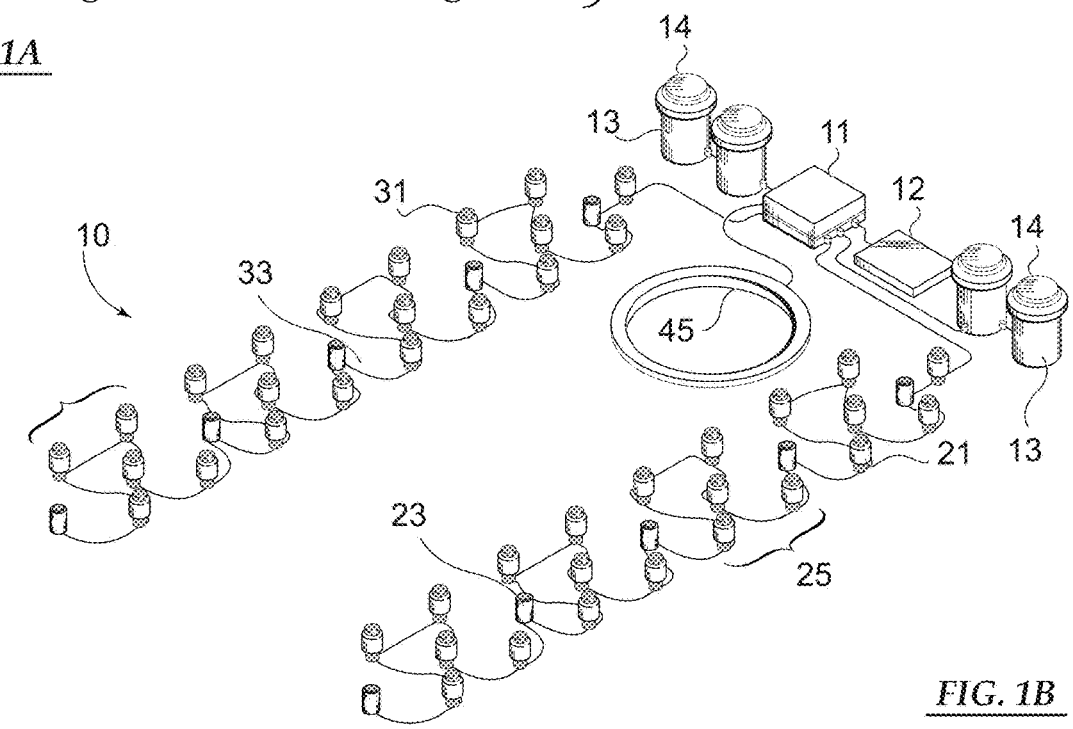
FIG. 1B is a perspective view of the LED and scorekeeping system.

Also with regard to FIG. 1B, the score keeping LED arrays 20, 30 are comprised of four sets 25, 35 of five individual score-keeping LEDs 21, 31, thereby totaling twenty score-keeping LEDs. Accordingly, the scorekeeping system 10 is particularly applicable to games played to a score to twenty-one. A special LED score keeping lamp 22, 32 is an advantage indication score-keeping LED. Hence, when this LED 22, 32 is activated, that player or team needs a final point to take the win otherwise the score will revert to another tie or what's commonly known as "deuce." Ambiance LEDs 23, 33 are provided for visual effect and can interact with a system microphone 17 as further detailed herein.

Figure 2:
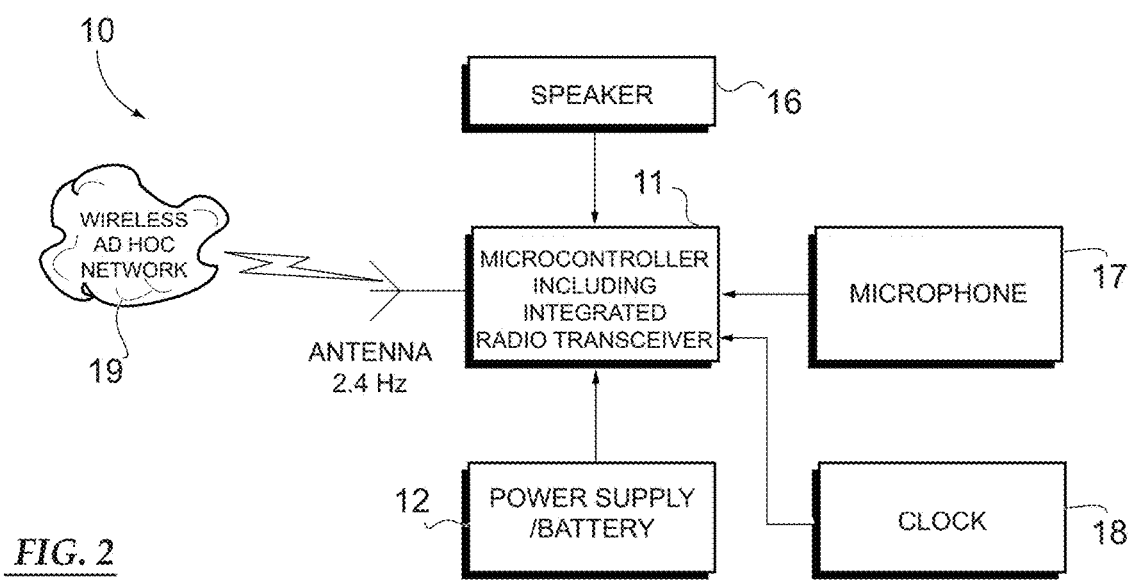
FIG. 2 is a functional block diagram of select electronic components.

Further with regard to FIG. 1B and FIG. 2, and in a preferred embodiment, the system 10 is a smart lighting system containing integrated circuit 11, and wireless 19 technology. More particularly, a printed circuit board (PCB) 11 is provided including a programmable microcontroller and software for user command and control. Also provided is an integrated radio transceiver coupled to an antenna for data transmission 19 between mobile devices or multiple game boards 41 (score boards) as detailed herein. A rechargeable battery 12 (e.g. lithium) provides reliable power to the system 10. Each scoring side 20, 30 has two push buttons 13 for user interface command and control. As an example, pressing and releasing all four push buttons 13 will reset entire score.

As typical with mobile device innovation, management and power consumption are important design considerations. The present invention aims to provide flexibility with multiple power sources to include; battery power 12, portable chargers, standard AC power from the electrical grid, and attachable or integrated solar chargers. In order to extend the amount of time that a mobile power source can last, the present invention 10 seeks to provide the user with tools to minimize power consumption. These tools include; adjusting colors, dimming the brightness of the LEDs, disabling non-essential LEDs, and allowing the system to enter sleep mode 18 after a configurable amount of time. These may be adjustable by push button 13 menu selection or a mobile device. In a preferred embodiment the push buttons themselves are illuminated with LEDs. 14 in its 13 center.

Other examples of adjustable user settings include; changing LED layout, the target score, the designated throwing sides, blinking or solid LEDs, LED color adjustment based on game play, whether displays are constant or triggered, speaker 16 sound volume, and microphone 17 sensitivity.

Additionally, with regard to FIG. 2, a simple tone speaker 16 is provided for audible indications including the score 20, 30 of the first and second individual player or team. This feature 16 is particularly useful when daytime light conditions make visual scorekeeping more difficult. The audible score could be communicated in a number of ways with simple tones. For example, a prolonged tone could signal adding five points while a short tone could add one point. Hence, two prolonged tones and two short tones would translate to twelve points. Or, as another example, the system 10 can produce higher frequency tones as the score increases. Additionally further as an example, the system 10 will simply add one tone per score change instead of indicating total score.

Yet still regarding FIG. 2, a microphone 17 is provided for detecting baseline (venue) music or a game piece impacting a game board 41. Accordingly, ambiance LEDs 23, 33 will flicker to the baseline music. Or, all or a particular portion of lights, 21, 22, 23, 31, 32, 33 respond to amplitude variations in unison. Also, the microphone 17 is configured to detect impacts to a game board 41. In this way, a sleep timer 18 could provide power savings by temporally deactivating the system when impacts are not detected for a predetermined amount of time. The sleep timer is configured to reset upon push button 13 or wireless 19 commands.

Figure 1C:
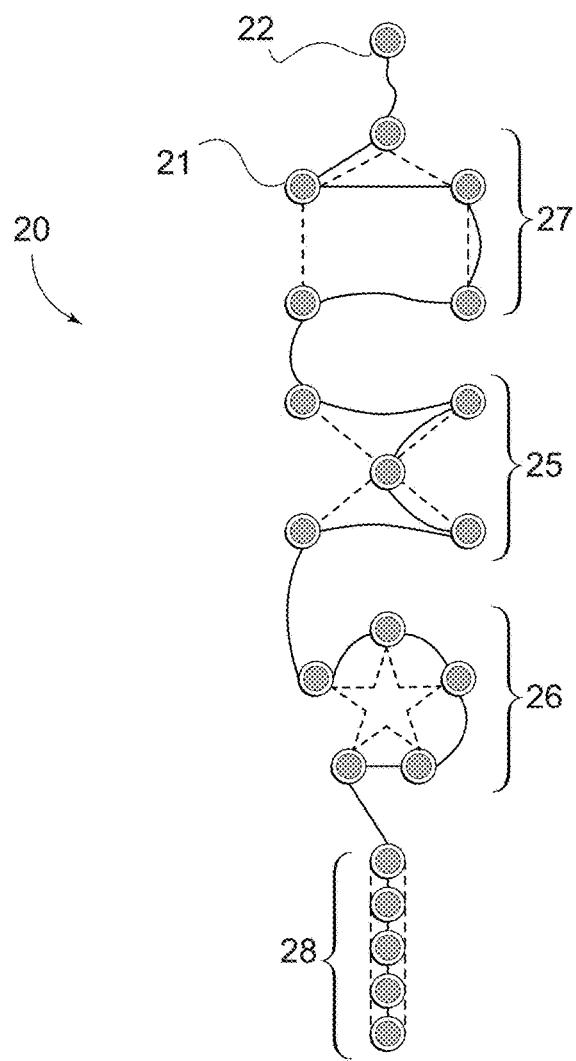
FIG. 1C is illustrative of alternative LED and scorekeeping arrangements.

Now with reference to FIG. 1C, the scorekeeping LED 21 layout 20 can be provided in multiple configurations 25, 26, 27, 28. Specifically, a set of five individual score-keeping LEDs is arranged in a shape of an X with an individual score-keeping LED 21 at each corner and in a center. Alternatively, a set of the five-individual score-keeping LEDs is arranged in a circle 26 at equal intervals thereby occurring at each point of a five-sided star 26. Alternatively, a set of the five-individual score-keeping LEDs is arranged as a house 27 with points 21 at four corners and a fifth 21 at an apex of a roof. Alternatively, the five LEDs are arranged in a straight line 28.

Figure 3A:
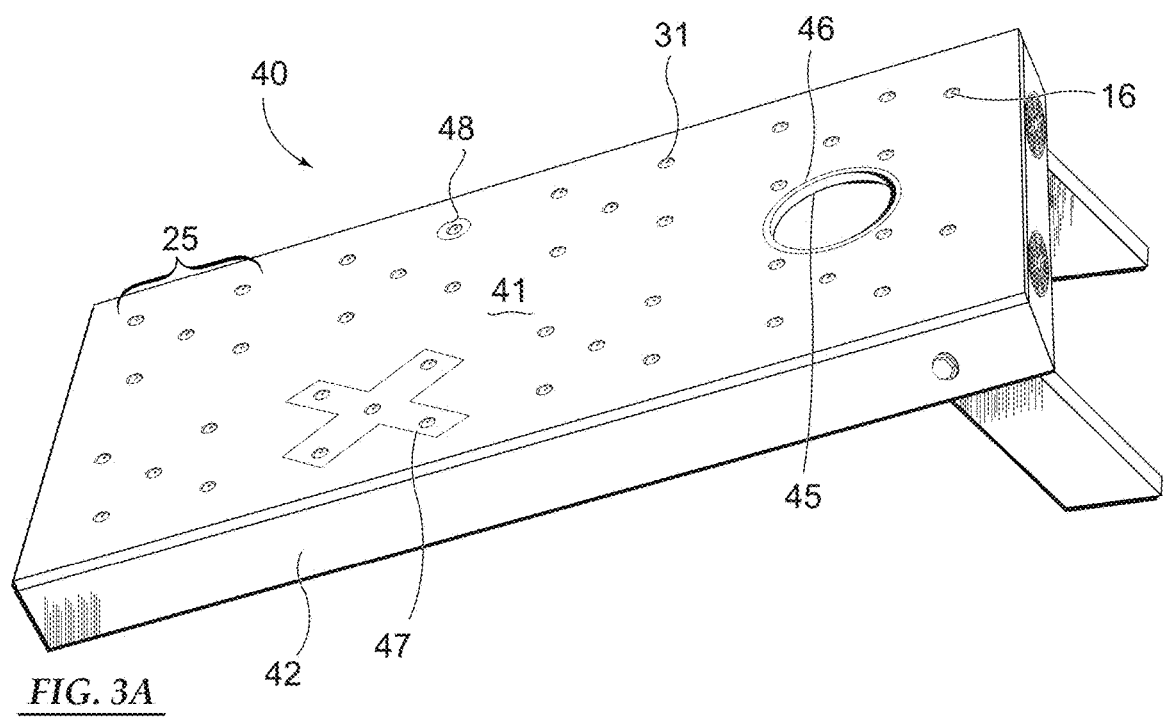
FIG. 3A is a first perspective view of a cornhole game configured and embedded with the present invention.
Figure 3B:
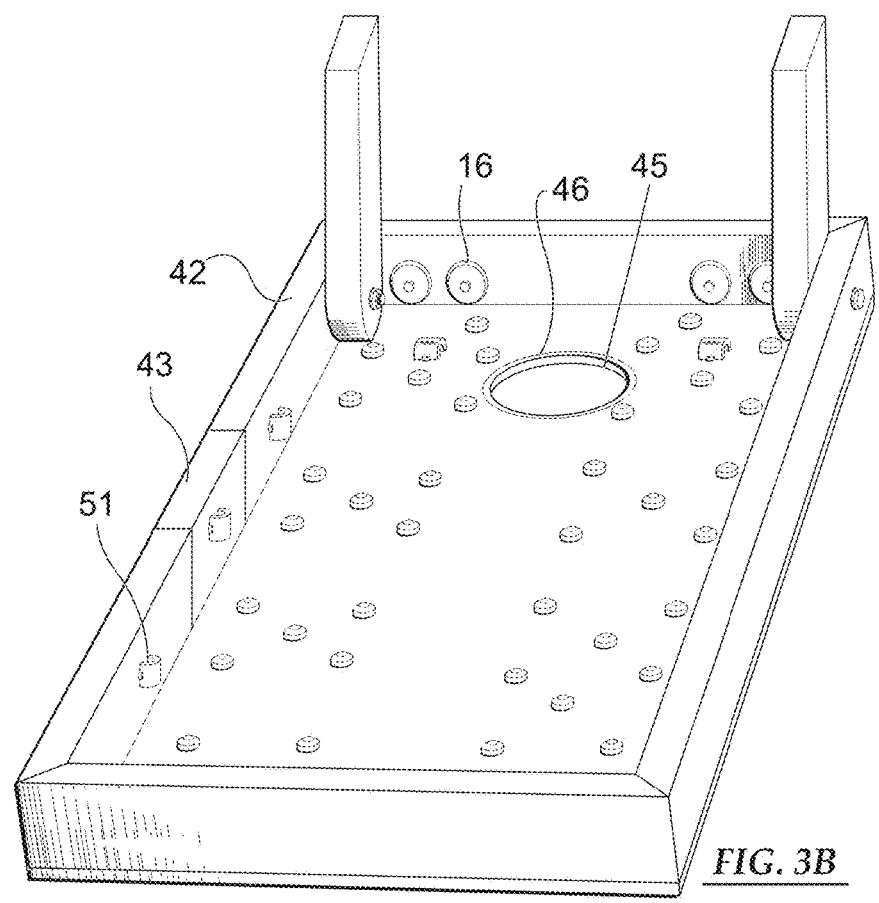
FIG. 3B is a second perspective view thereof from an underneath vantage point.
Figure 4A:
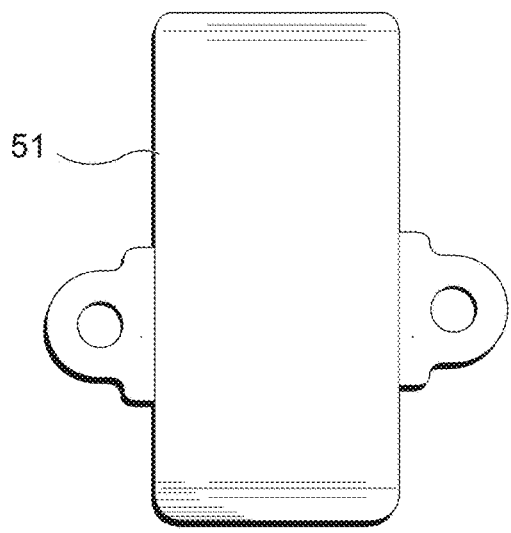
FIG. 4A is a front elevational view of a translucent mounting bracket attachable to a cornhole platform.
Figure 4B:
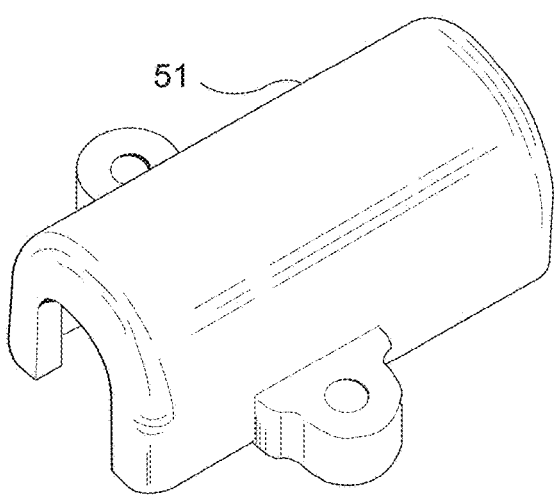
FIG. 4B is a perspective view thereof.
Figure 4C:
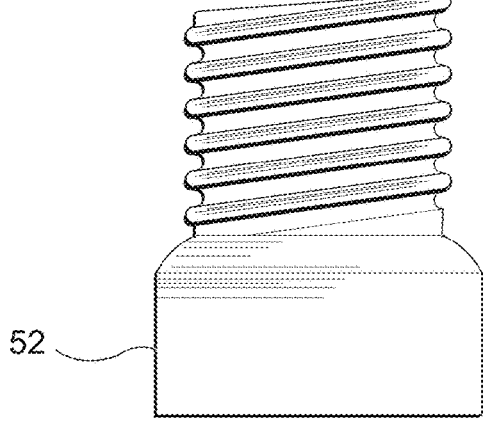
FIG. 4C is a front elevational view of a mounting cap embeddable to a cornhole platform.
Figure 4D:
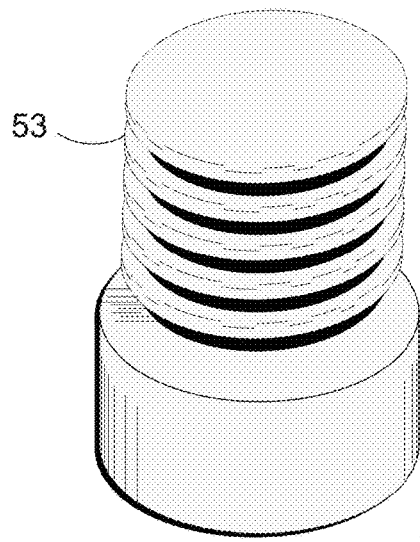
FIG. 4D is a perspective view of the LED mounting cap.

With reference to FIG. 3A and FIG. 3B, the invention 10 is particularly useful as the cornhole 40 bag toss game utilizes two game boards 41. Herein, the game board is also the scoreboard 20, 30, 22, 32 providing support and rigidity to the electronic lighting and scorekeeping system 10. The game board has a surface 41 and an outer frame 42 around the surface 41. In this embodiment 40, a cornhole specific LED attachment 45 lights up the target 45. Also in the preferred embodiment, LEDs 21, 22, 23, 31, 32, 33, 45 are addressable in that processor 11 can control signal pulse and light combinations to vary color, brightness (dimmer control) and duration.

With regard to FIG. 3B together with FIG. 4A through FIG. 4D, a plurality of translucent LED mounting caps 52 (or bullets 52) are provided for embedding individual score-keeping LED lamps 21, 31 to the game board 41 from underneath. Each cap (or bullet) 52 has threads 53 for combining and incorporating to the surface 41 of the game board. Alternatively, the cap 52 can be tapped/pressed/hammered or subsequently glued in place. Ambiance LED mounting brackets 51 are provided for attaching each of the plurality of ambiance LEDs 23, 33 to an interior facing side of the outer frame 42 and elsewhere on the game board 41. The brackets 51 and caps 52 are translucent and easily transmit light 21, 22, 23, 31, 32, 33. Additionally, cap 52 design includes a geometry specifically designed to transmit light more effectively, especially for supporting embedded acrylic sheets 47 into the boards 41.

Still further with regard to FIG. 3B, one or more epoxy inlay(s) are configured to at least one ambiance mounting bracket 51. The inlays 43, 46, 48 are particularly useful in light transmission since game boards 41 are typically made from hard wood and absorb light without transmission. In still another embodiment, epoxy inlays 48 are poured around score-keeping LEDs 21, 31 embedded around the game board surface 41.

Also with reference to FIG. 3A, the epoxy inlays 43, 46, 48 and acrylic sheets 47, are both types of plastics however with different uses. Epoxy 43, 46, 48 will combine a liquid compound (e.g. resin) with a catalyst which activates and cures into a hardened state. This permits pouring into molds, channels or pockets to create epoxy inlays 43, 46, 48. And conversely, the acrylic surface 47 is manufactured in sheets and may be cut into the desired shape. For example, an "X" shape 47 or optionally a "LOGO," configured to the cornhole game board 41. It is also preferred that the acrylic 47 and plywood 41 are machined together.

In still a particular embodiment, a ring 48 is machined around a scoring LED 21, 31 by boring a hole half-way through the game surface 41. After epoxy is poured and cured, the board can be turned upside down and bored through the other half exposing the hardened epoxy. Then epoxy can be poured and cured to the other half. This will provide increased light transmission and the technique can also be applied for inlaying a ring 46 around the cornhole specific LED attachment 45. Alternatively, the ring LED 45 could go under the ring epoxy inlay.

With reference to FIG. 2, the invention 10, 40 additionally comprises (or is part of) a wireless ad hoc network 19. Hence, the invention is a smart 19 electronic lighting and score lighting and scorekeeping system 10, 40. In this way 19, communication between two game boards 41 is possible as well as mobile device command and control. Or stated differently, a wireless ad hoc network 19 could be established without mobile devices and solely between game boards 41 spaced apart. Also, the wireless network 19 of the present invention can provide league and tournament data recording, transmission and management. And with addressable LEDs combined with acrylic sheet and epoxy inlays, invention embodiments can include ambiance displays (e.g. simulated fire, comets, color spectrum swirling, and demo mode). Command and control could also be accomplished by touch screen or graphical user interface (GUI) integrated to the board 40, 41 or other user interface.

While the particular Addressable Lighting and Scorekeeping System herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

I claim:

1. An electronic lighting and scorekeeping system for competitive games comprising:
    an LED light array for providing scorekeeping and ambiance to the competitive game;
    a programmable microcontroller configured to a printed circuit board (PCB), the printed circuit board further comprising an integrated transceiver coupled to an antenna;
    a first game board for containing and incorporating the LED light array and providing said scorekeeping;
    a power supply configured to the first game board for powering the LED array and the system;
    a speaker for transmitting an audible tone, the audible tone additionally providing scorekeeping; and
    at least one user-interface for command and control of the LED light array providing scorekeeping and ambiance, wherein a combination of LEDs from the LED light array communicate a player or a team's score, additionally wherein the user interface comprises at least one mobile device, wherein the LED array together with the at least one mobile device and the microcontroller form a wireless ad hoc network; and
    a second game board coupled to the wireless ad hoc network.

2. The electronic lighting and scorekeeping system for competitive games of claim 1, the programmable microcontroller comprising software for controlling an electrical current pulse thereby providing an addressable LED light array.

3. An electronic lighting and scorekeeping system for competitive games comprising:
    an LED light array for providing scorekeeping and ambiance to the competitive game;
    a first game board for containing and incorporating the LED light array and providing said scorekeeping;
    at least one translucent epoxy inlay configured to the first game board, the at least one epoxy inlay configured for partial transmission of light from the LED light array, wherein epoxy material is poured into a hole, channel or mold in or configured to the first game board, the epoxy material subsequently hardening and providing the partial transmission of light.

4. The electronic lighting and scorekeeping system for competitive games of claim 3, the LED array comprising a plurality of individual LEDs, wherein further the at least one epoxy inlay further comprises an epoxy inlay encircling an individual LED.

5. The electronic lighting and scorekeeping system for competitive games of claim 3, the LED array comprising a target LED, wherein further the at least one epoxy inlay comprises an epoxy inlay ring encircling the target LED.

6. The electronic lighting and scorekeeping system for competitive games of claim 5, the LED array comprising a plurality of individual LEDs, wherein the first game board further comprises an acrylic sheet is configured over at least one of the plurality of individual LEDs.

7. An electronic lighting and scorekeeping system for competitive games comprising:
    an LED light array for providing scorekeeping and ambiance to the competitive game;
    a programmable microcontroller configured to a printed circuit board (PCB), the printed circuit board further comprising an integrated transceiver coupled to an antenna;
    a first game board for containing and incorporating the LED light array and providing said scorekeeping;
    a power supply configured to the first game board for powering the LED array and the system;
    a speaker for transmitting an audible tone, the audible tone additionally providing scorekeeping; and
    at least one user-interface for command and control of the LED light array providing scorekeeping and ambiance, wherein a combination of LEDs from the LED light array communicate a player or a team's score, additionally wherein the user interface comprises at least one mobile device, wherein the LED array together with the at least one mobile device and the microcontroller form a wireless ad hoc network; and
    a microphone for receiving a multiplicity of sound waves converting signals therefrom to the LED light array.

8. The electronic lighting and scorekeeping system for competitive games of claim 7 further comprising a second game board coupled to the wireless ad hoc network.

* * * * *